United States Patent [19]

Ida et al.

[11] 4,287,783

[45] Sep. 8, 1981

[54] MECHANISM FOR LUBRICATING BEARINGS OF A COUNTER SHIFT GEAR FOR A GEAR TRANSMISSION

[75] Inventors: Shiuichiro Ida; Shoichi Ohshima; Syunichi Hirashima, all of Toyota; Harada Yukihiro, Kariya, all of Japan

[73] Assignee: Toyota Jidosha Kogyo Kabushiki Kaisha, Toyota, Japan

[21] Appl. No.: 108,229

[22] Filed: Dec. 28, 1979

[30] Foreign Application Priority Data

Oct. 22, 1979 [JP] Japan ............... 54-144863[U]

[51] Int. Cl.³ ................... F16N 7/36; F01M 9/06
[52] U.S. Cl. ......................... 74/467; 184/6.12
[58] Field of Search .................. 74/467; 184/6.12

[56] References Cited

U.S. PATENT DOCUMENTS

| | | | |
|---|---|---|---|
| 2,328,104 | 8/1943 | Simpson | 184/6.12 X |
| 3,097,546 | 7/1963 | Kelbel et al. | 74/467 X |
| 3,583,526 | 6/1971 | Muelleder et al. | 74/467 |
| 3,605,946 | 9/1971 | Oehl | 184/6.12 X |
| 3,618,711 | 11/1971 | Vollmer | 184/6.12 |

FOREIGN PATENT DOCUMENTS

| | | | |
|---|---|---|---|
| 80976 | 7/1920 | Austria | 184/6.12 |
| 955571 | 1/1957 | Fed. Rep. of Germany | 184/6.12 |
| 1625032 | 6/1970 | Fed. Rep. of Germany | 184/6.12 |
| 2836899 | 5/1979 | Fed. Rep. of Germany | 74/467 |

*Primary Examiner*—Lawrence J. Staab
*Attorney, Agent, or Firm*—Finnegan, Henderson, Farabow, Garrett & Dunner

[57] ABSTRACT

A gear transmission including a casing containing lubrication oil therein, a counter shaft rotatably mounted in the casing and constantly transmitting rotational movement from a power input shaft by gear trains, a counter shift gear rotatably mounted on the counter shaft through a bearing, a shift gear rigidly mounted on a power output shaft and being in constant meshing engagement with the counter shift gear, and a clutch for interrupting the relative rotational movement between the counter shaft and the counter shift gear. The counter shaft is provided therein with an oil port, one end of which is opened at one edge surface of the counter shaft and the other end of which is opened at the abutting surface between the counter shaft and the bearings. Lubrication oil is supplied to the bearings through the oil port.

3 Claims, 4 Drawing Figures

MECHANISM FOR LUBRICATING BEARINGS OF A COUNTER SHIFT GEAR FOR A GEAR TRANSMISSION

BACKGROUND OF THE INVENTION

This invention relates to bearing lubrication of a gear transmission for motor vehicles, and more particularly relates to a mechanism for lubricating bearings which rotatably support a counter shift gear with respect to a counter shaft which is constantly rotated by an input shaft.

In a constant mesh type gear transmission, each of the counter shift gears is rigidly mounted on a counter shaft, and each of the shift gears, which are in constant meshing engagement with each of said counter shift gears, is rotatably supported with respect to a power output shaft.

A gear transmission having a five stages forward shift mechanism is known in the prior art, in which a fifth shift mechanism (over top mechanism) comprises a counter fifth gear rotatably mounted on the rear end of a counter shaft, a fifth shift gear rigidly mounted on a power output shaft and being in constant meshing engagement with said counter fifth gear, and means for interrupting the relative rotational movement between the counter shaft and the counter fifth gear, thereby putting the gear transmission into a fifth shift condition (over top condition).

SUMMARY OF THE INVENTION

An object of the present invention is to provide a new and useful lubrication mechanism of a gear transmission which effectively lubricates bearings which rotatably support a counter shift gear with respect to a counter shaft.

Another object of the present invention is to provide a lubrication mechanism for lubricating bearings and an inner race, especially the bearings which rotatably support a counter fifth gear with respect to a counter shaft.

A bearing lubrication mechanism of the present invention comprises a casing containing lubrication oil therein, a counter shaft rotatably mounted in said casing and constantly transmitting rotational movement from an power input shaft by means of gear trains, a counter shift gear rotatably mounted on said counter shaft through bearings, a shift gear rigidly mounted on a power output shaft and being in constant meshing engagement with said counter shift gear, and clutch means for interrupting the relative rotational movement between said counter shaft and said counter shift gear, wherein said counter shaft is provided therein with an oil port, one end of which is opened at one end surface of said counter shaft and the other end of which is opened to the abutting surface between said counter shaft and said bearings.

DESCRIPTION OF A PRIOR ART

Figure 4:
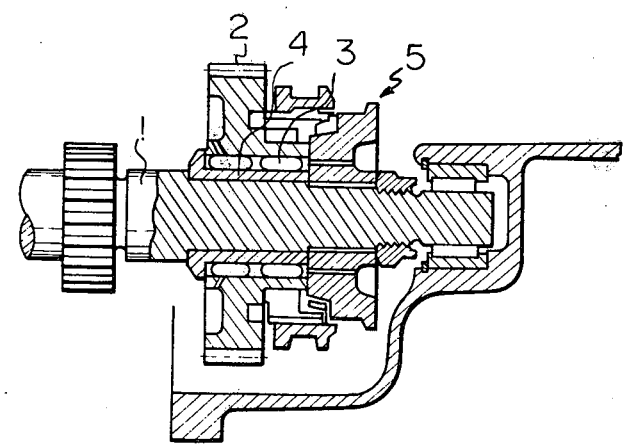

Referring to FIG. 4, there is illustrated a conventional bearing means known in the prior art for rotatably supporting a counter fifth gear with respect to a counter shaft. In FIG. 4, on a rear end of a counter shaft 1 is a counter fifth gear 2 rotatably mounted through counter fifth bearings 3 and a fifth inner race 4. When the gear transmission is in a fifth shift condition, the relative rotational movement between the counter shaft 1 and the counter fifth gear 2 is interrupted by a clutch means 5. In the conventional gear transmission, there are no special means for supplying lubrication oil to the counter fifth bearings 3 and the fifth inner race 4. Therefore, lubrication oil is not sufficiently supplied to the abutting surfaces between the counter shaft 1 and the fifth inner race 4, between the fifth inner race 4 and the counter fifth bearings 3, and between the bearings 3 and the counter fifth gear 2, thereby causing various problems due the lack of lubrication.

DESCRIPTION OF PREFERRED EMBODIMENTS

Figure 1:
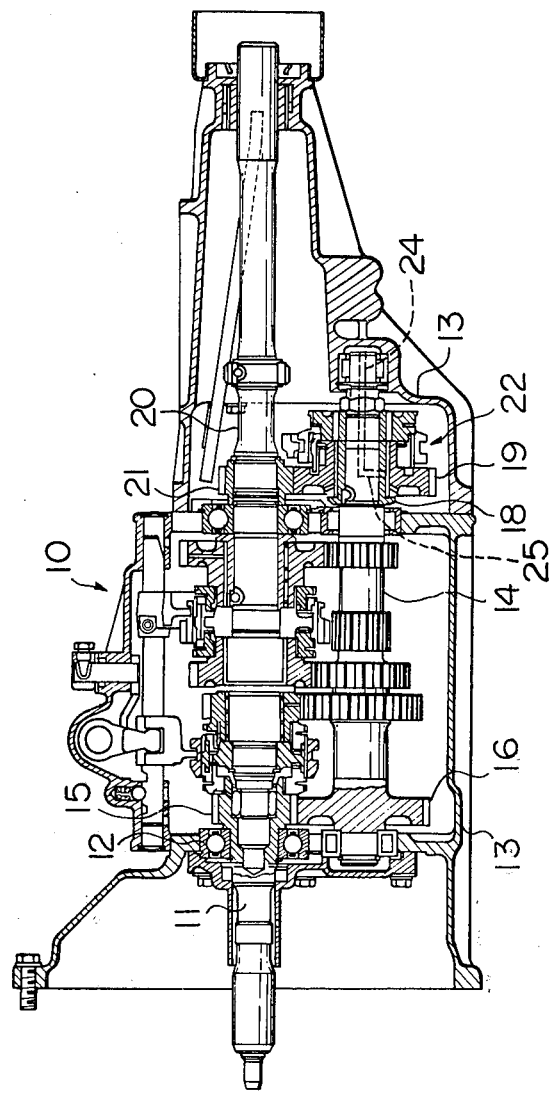
FIG. 1 is a cross-sectional view of a gear transmission having a fifth shift mechanism (over top mechanism) for motor vehicles which employs a bearing lubrication mechanism of the present invention.

Referring now to FIG. 1, there is illustrated a gear transmission 10 having a fifth shift mechanism (over top mechanism) for motor vehicles which employs a bearing lubrication mechanism of the present invention. The gear transmission 10 itself is one type of a constant mesh type gear transmission conventionally known in the prior art, and therefore a detailed explanation concerning the construction and operation thereof will not be necessary.

A power input shaft 11 is rotatably supported in a casing 13 of the gear transmission 10 by means of bearings 12. A counter shaft 14, arranged in parallel to the power input shaft 11 and rotatably supported in the casing 13, is constantly rotated by the power input shaft 11, since a power input gear 15 integrally formed with the power input shaft 11 is in constant meshing engagement with a counter input gear 16 which is rigidly mounted on the counter shaft 14.

Figure 2:
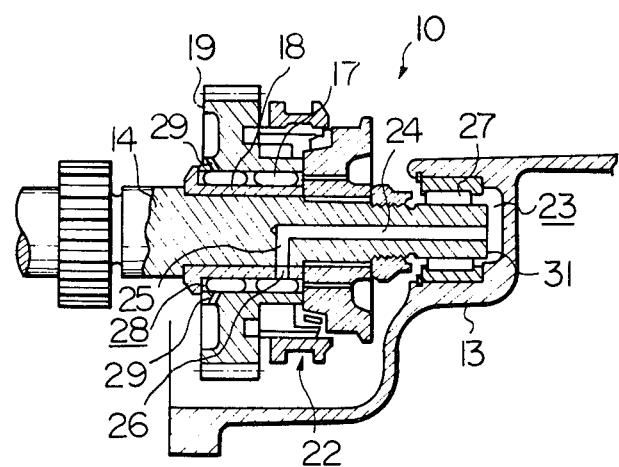
FIG. 2 is a cross-sectional view of an embodiment of a bearing lubrication mechanism of the present invention.

A counter fifth gear 19, more clearly illustrated in FIG. 2, is rotatably mounted at the rear end of the counter shaft 14 through counter fifth bearings 17, preferably comprising roller bearings, and a counter fifth inner race 18. The counter fifth gear 19 is in constant meshing engagement with a fifth shift gear 21 which is rigidly mounted on a power output shaft 20 (FIG. 1). In order to shift the gear transmission into a fifth shift or over top condition, a clutch means 22 is actuated so that the relative rotational movement between the counter shaft 14 and the counter fifth gear 19 is interrupted. In this case, the rotational torque of the counter shaft 14 is transmitted to the power output shaft 20 through the counter fifth gear 19 and the fifth shift gear 21. When the gear transmission is in this fifth shift condition, the power output shaft 20 is rotated at a higher speed than when in the forth shift condition, in which the power output shaft 20 is directly connected to the power input shaft 11.

The counter shaft 14 is provided at the rear end thereof with an axial oil port 24, as illustrated in FIG. 2, which extends along the center axis of the counter shaft 14 and one end of which is opened, at the rear edge surface 31 of the counter shaft 14, to a portion indicated by reference numeral 23 within the casing 13. The counter shaft 14 is also provided with at least one radial oil port 25 which is in communication with the axial oil port 24. In addition, the inner race 18 of the counter fifth bearings 17 is provided with at least one radial oil port 26 which is in communication with the radial oil port 25 of the counter shaft 14 and which is opened to the abutting surface between the inner race 18 and the counter fifth bearings 17.

The lubrication oil is supplied from the inside space of the casing 13 into the portion 23 of the casing 13 through a counter bearing 27, which rotatably supports the counter shaft 14 at the rear end of the casing 13, and is then supplied through the axial oil port 24 and the radial oil port 25, so that a part of the lubrication oil lubricates the abutting surface between the inner race 18 and the counter shaft 14, and the remaining oil flows through the radial oil port 26 to lubricate the counter fifth bearings 17. The lubrication oil, now supplied into an annular space 28, which is defined between the inner race 18 and the counter fifth gear 19 and into which the counter fifth bearings 17 are disposed, is discharged through a port 29 formed in this counter fifth gear 19 to the outside protion, that is to say, the inside space of the casing 13.

Figure 3:
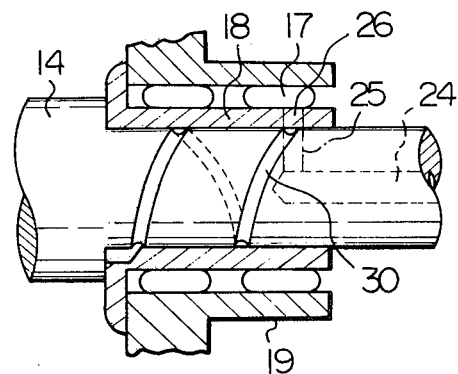
FIG. 3 is a cross-sectional view of another embodiment of a bearing lubrication mechanism of the present invention; and, FIG. 4 is a cross-sectional view of an example of a conventional bearing lubrication mechanism known in the prior art.

In FIG. 3, there is illustrated another embodiment of a bearing lubrication mechanism of the present invention. It will be sufficient to explain the points different from the embodiment illustrated in FIG. 2. According to the embodiment illustrated in FIG. 3, in order to effectively lubricate, particularly the abutting surface between the counter shaft 14 and inner race 18, the counter shaft 14 is provided with a helical recess 30 on the outer surface of the shaft 14 which contacts the inner race 18. The helical recess 30 advantageously extends from the position in which the radial oil port 25 of the counter shaft 14 is located, as viewed in FIG. 3.

According to the present invention, the counter fifth bearings 17 and the counter fifth inner race 18 are effectively lubricated, particularly when the gear transmission is operated in fifth shift condition (over top condition) and the vehicle is running at a continuous high speed. Various problems due to the lack of lubrication are therefore eliminated.

What is claimed is:

1. In a gear transmission including a casing containing lubrication oil, a counter shaft rotatably mounted in said casing and constantly transmitting rotational movement from a power input shaft by means of gear trains, a counter shift gear rotatably mounted on said counter shaft through bearings disposed in an annular space, a shift gear rigidly mounted on a power output shaft and being in constant meshing engagement with said counter shift gear, and clutch means for interrupting the relative rotational movement between said counter shaft and said counter shift gear, the improvement comprising:

an annular counter inner race disposed between said bearings and said counter shaft and interfacing with and removably secured to said counter shaft for rotation with said counter shaft; and means for lubricating said bearings and the adjacent surfaces of said counter shaft and said counter inner race comprising an axial oil port in fluid communication with the interior of said casing extending axially of said counter shaft, a first radial oil port in fluid communication with said axial port and with the interface between the adjacent surfaces of said counter shaft and said counter inner race, and a second radial oil port in said counter inner race in fluid communication with said first radial oil port and the annular space in which said bearings are disposed.

2. A bearing lubrication mechanism as set forth in claim 1, wherein said counter shaft is provided with a helical recess in its outer surface adjacent said counter inner race, said helical recess being in fluid communication with said first radial oil port.

3. A bearing lubrication mechanism as set forth in claim 1, wherein said counter shaft gear is provided with a third oil port providing fluid communication between the annular space in which said bearings are disposed and the interior of said casing.

* * * * *

UNITED STATES PATENT AND TRADEMARK OFFICE
CERTIFICATE OF CORRECTION

PATENT NO. : 4,287,783
DATED : September 8, 1981
INVENTOR(S) : Shiuichiro Ida, Shoichi Ohshima, Syunichi Hirashima and Yukihiro Harada It is certified that error appears in the above—identified patent and that said Letters Patent is hereby corrected as shown below:

On the Title Page, Item [75] Inventors: "Harada Yukihiro" should read --- Yukihiro Harada ---.

Signed and Sealed this

Twenty-third Day of February 1982

[SEAL]

Attest:

Attesting Officer

GERALD J. MOSSINGHOFF

Commissioner of Patents and Trademarks